United States Patent Office 3,148,186
Patented Sept. 8, 1964

3,148,186
DERIVATIVES OF 2-FORMYL-2-ANDROSTENES AND PREGNENES
James C. Orr, Lincoln, Mass., assignor to Syntex Corporation, Panama, Panama, a corporation of Panama
No Drawing. Filed Aug. 16, 1963, Ser. No. 302,732
19 Claims. (Cl. 260—239.55)

The present invention relates to novel cyclopentanophenanthrene derivatives and to a process for the production thereof.

More particularly the present invention relates to novel unsaturated derivatives of $\Delta^2$-androsten compounds.

The novel compounds of the present invention are represented by the following formulae:

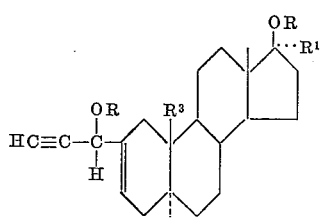

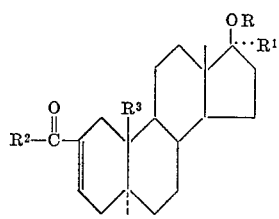

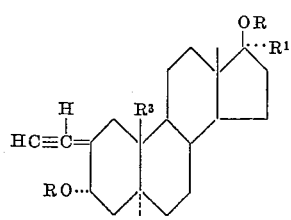

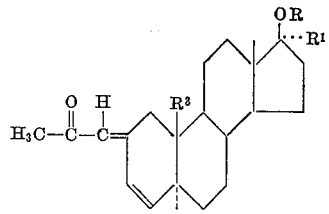

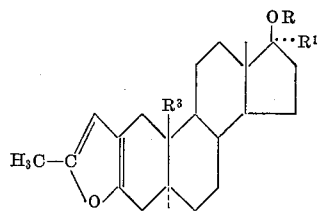

In the above formulae R represents hydrogen or a hydrocarbon carboxylic acyl group of less than 12 carbon atoms; $R^1$ represents hydrogen, lower alkyl, lower alkenyl or lower alkinyl; $R^2$ represents vinyl or ethinyl and $R^3$ represents hydrogen or methyl.

The acyl group is derived from hydrocarbon carboxylic acids containing less than 12 carbon atoms which may be saturated or unsaturated of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and $\beta$-chloropropionate.

The novel compounds of the present invention represented by the above formulae are anabolic-androgenic agents with a favorable anabolic-androgenic ratio. In addition, they have anti-estrogenic, anti-gonadotrophic, anti-fibrillatory and appetite stimulating properties. Furthermore, the lower the blood cholesterol level, relieve premenstrual tension and suppress the output of the pituitary gland.

The novel compounds of the present invention are prepared by the process exemplified as follows:

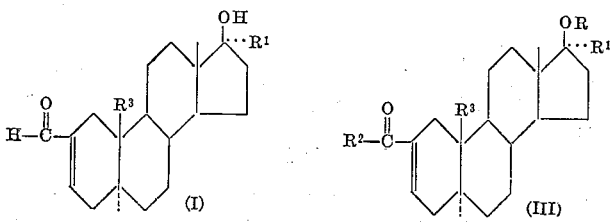

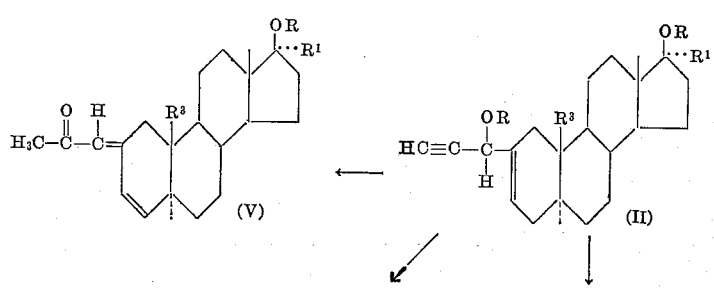

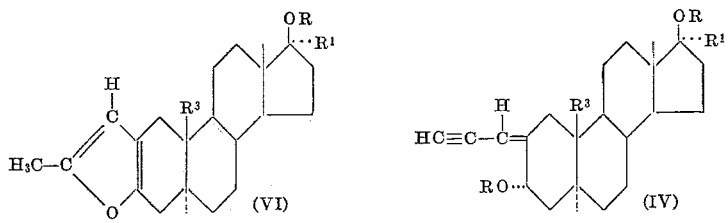

In the above formulae R, $R^1$, $R^2$ and $R^3$ have the same meaning as set forth hereinbefore.

In practicing the process outlined above the starting 2-formyl-$\Delta^2$androsten-17β-ol derivative (I) is treated with a current of acetylene in the presence of potassium t-amylate to give the corresponding 2-(1'-hydroxyprop-2'-inyl)-$\Delta^2$-androsten-17β-ol (II; R=H), which upon reaction with approximately 1 molar equivalent of 2,3-dichloro-5,6-dicyano-1,4-benzoquinone at room temperature for approximately 3 hours, preferably in dioxane, yields the corresponding 2-(1'-oxo-prop-2'-inyl)-$\Delta^2$-androsten-17β-ol (III; $R^2$=ethinyl, R=H). The latter compound upon treatment with approximately 1 mol equivalent of hydrogen in the presence of a mild catalyst such as 2% palladium on calcium carbonate yields the corresponding 2-(1'-oxo-prop-2'-enyl)-$\Delta^2$-androsten-17β-ol derivative (III; $R^2$=vinyl, R=H). The aforesaid 2-(1'-hydroxy-prop-2'-inyl)-$\Delta^2$-androsten-17β-ol derivative (II; R=H) is treated with aqueous sulfuric acid, preferably in dioxane at reflux temperature for approximately 5 hours, thus affording a product which upon chromatographic separation affords the corresponding 2-(prop-3'-inylidene)androsten-3α,17β-ol (IV; R=H), 2-(2'-oxopropylidene)-$\Delta^3$-androsten-17β-ol (V; R=H); and 2'-methylfurano-(4',5';2,3)-androstan-17β-ol (VI; R=H) derivatives.

The compounds of the present invention having a secondary hydroxyl group, are conventionally acylated in pyridine with an acylating agent, such as an anhydride or a chloride of a hydrocarbon carboxylic acid of the type described hereinbefore, to give the corresponding acylates.

The compounds of the present invention having in the molecule a tertiary hydroxyl group, e.g., at C-17, are conventionally esterified in the presence of p-toluenesulfonic acid with an acylating agent, such as acetic anhydride, caproic anhydride, cyclopentylpropionic anhydride or enanthic anhydride, to produce the corresponding esters. The secondary hydroxyl groups are also esterified by the latter procedure.

The following specific examples serve to illustrate but are not intended to limit the scope of the present invention:

Example I

A solution of 1 g. of 2-formyl-$\Delta^2$-androsten-17β-ol (U.S. Pat. No. 3,077,485) in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded 2-(1'-hydroxy-prop-2'-inyl)-$\Delta^2$-androsten-17β-ol (compound No. 1).

The compounds listed hereinafter under A (U.S. Pat. No. 3,077,485) were treated according to the above procedure, thus yielding the corresponding products set forth under B:

| A | Cpd. No. | B |
|---|---|---|
| 2-formyl-17α-methyl-$\Delta^2$-androsten-17β-ol. | 2 | 2-(1'-hydroxy-prop-2'-inyl)-17α-methyl-$\Delta^2$-androsten-17β-ol. |
| 2-formyl-17α-vinyl-$\Delta^2$-androsten-17β-ol. | 3 | 2-(1'-hydroxy-prop-2'-inyl)-17α-vinyl-$\Delta^2$-androsten-17β-ol. |
| 2-formyl-17α-ethinyl-$\Delta^2$-androsten-17β-ol. | 4 | 2-(1'-hydroxy-prop-2'-inyl)-17α-ethinyl-$\Delta^2$-androsten-17β-ol. |
| 2-formyl-19-nor-$\Delta^2$-androsten-17β-ol. | 5 | 2-(1'-hydroxy-prop-2'-inyl)-19-nor-$\Delta^2$-androsten-17β-ol. |
| 2-formyl-17α-methyl-19-nor-$\Delta^2$-androsten-17β-ol. | 6 | 2-(1'-hydroxy-prop-2'-inyl)-17α-methyl-19-nor-$\Delta^2$-androsten-17β-ol. |
| 2-formyl-17α-ethinyl-19-nor-$\Delta^2$-androsten-17β-ol. | 7 | 2-(1'-hydroxy-prop-2'-inyl)-17α-ethinyl-19-nor-$\Delta^2$-androsten-17β-ol. |

Example II

A mixture of 1 g. of compound No. 1 in 20 cc. of dioxane, and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 2-(1'-oxo-prop-2'-inyl)-$\Delta^2$-androsten-17β-ol (cpd. No. 8).

The compounds Nos. 2 to 7, inclusive, were treated according to the latter procedure, thus furnishing respectively:

Cpd. No.
9  2-(1'-oxo-prop-2'-inyl)-17α-methyl-$\Delta^2$-androsten-17β-ol,
10  2-(1'-oxo-prop-2'-inyl)-17α-vinyl-$\Delta^2$-androsten-17β-ol,
11  2-(1'-oxo-prop-2'-inyl)-17α-ethinyl-$\Delta^2$-androsten-17β-ol,
12  2-(1'-oxo-prop-2'-inyl)-19-nor-$\Delta^2$-androsten-17β-ol,
13  2-(1'-oxo-prop-2'-inyl)-17α-methyl-19-nor-$\Delta^2$-androsten-17β-ol.
14  2-(1'-oxo-prop-2'-inyl)-17α-ethinyl-19-nor-$\Delta^2$-androsten-17β-ol.

Example III

A solution of 1 g. of compound No. 8, in 40 cc. of pyridine was hydrogenated at 25° C. and 570 mm. in the presence of 400 mg. of pre-hydrogenated 2% palladium on calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 2-(1'-oxo-prop-2'-enyl)-Δ² - androsten-17β-ol (cpd. No. 15).

The compounds Nos. 9 to 14, inclusive, were treated by the same procedure, thus yielding respectively:

Cpd. No.
16  2-(1'-oxo-prop-2'-enyl)-17α-methyl-Δ²-androsten-17β-oil.
17  2-(1'-oxo-prop-2'-enyl)-17α-vinyl-Δ²-androsten-17β-ol.
18  2-(1'-oxo-prop-2'-enyl)-17α-ethyinyl-Δ²-androsten-17β-oil.
19  2-(1'-oxo-prop-2'-enyl)-19-nor-Δ²-androsten-17β-ol.
20  2-(1'-oxo-prop-2'-enyl)-17α-methyl-19-nor-Δ²-androsten-17β-ol.
21  2-(1'-oxo-prop-2'-enyl)-17α-ethinyl-19-nor-Δ²-androsten-17β-ol.

Example IV

A mixture of 1 g. of compound No. 1, 2 cc. of concentrated sulfuric acid, 200 cc. of water and 200 cc. of dioxane were refluxed for 5 hours. Water was added, and the mixture was extracted with methylene chloride. The organic extract was washed with 5% aqueous sodium hydroxide, water to neutral, dried and evaporated to dryness. The residue was chromatographed on 40 g. of alumina thus being separated into three products, namely 2-(prop-3'-inylidene)-androstane-3α,17β-diol (cpd. No. 22), 2-(2'-oxo-propylidene)-Δ³-androsten-17β-ol (cpd. No. 23), and 2'-methyl-furano-(4',5';2,3)-androstan-17β-ol (cpd. No. 24).

Upon treatment, by the same technique, of the starting compounds set forth hereinafter, there were obtained correspondingly the final compounds listed below:

| Starting Compound | Final compounds |
|---|---|
| Compound No. 2 | 25 2-(prop-3'-inylidene)-17α-methyl-androstane-3α, 17β-diol. |
|  | 26 2-(2'-oxo-propylidene)-17α-methyl-Δ³-androsten-17β-ol. |
|  | 27 2'-methyl-furano-(4', 5'; 2,3) 17α-methyl-androstan-17β-ol. |
| Compound No. 3 | 28 2-(prop-3'-inylidene)-17α-vinyl-androstane-3α, 17β-diol. |
|  | 29 2-(2'-oxo-propylidene)-17α-vinyl-Δ³-androsten-17β-ol. |
|  | 30 2'-methylfurano-(4',5'; 2,3)-17α-vinyl-androstan-17β-ol. |
| Compound No. 4 | 31 2-(prop-3'-inylidene)-17α-ethinyl-androstane-3α-17β-diol. |
|  | 32 2-(2'-oxo-propylidene)-17α-ethinyl-Δ³-androsten-17β-ol. |
|  | 33 2'-methyl-furano-(4',5'; 2,3) 17α-ethinyl-androstan-17β-ol. |
| Compound No. 5 | 34 2-(prop-3'-inylidene)-19-nor androstane-3α, 17β-diol. |
|  | 35 2-(2'-oxo-propylidene)-19-nor-Δ³-androsten-17β-ol. |
|  | 36 2'-methyl-furano-(4',5'; 2,3) 19-nor-androstan-17β-ol. |
| Compound No. 6 | 37 2-(prop-3'-inylidene)-17α-methyl-19-nor-androstane-3α,17β-diol. |
|  | 38 2-(2'-oxo-propylidene)-17α-methyl-19-nor-Δ³-androsten-17β-ol. |
|  | 39 2'-methyl-furano-(4',5'; 2,3) 17α-methyl-19-nor-androstan-17β-ol. |
| Compound No. 7 | 40 2-(prop-3'-inylidene)-17α-ethinyl-19-nor-androstane-3α, 17β-diol. |
|  | 41 2-(2'-oxo-propylidene)-17α-ethinyl-19-nor-Δ³-androsten-17β-ol. |
|  | 42 2'-methyl-furano-(4',5'; 2,3) 17α-ethinyl-19-nor-androstan,17β-ol. |

Example V

A mixture of 1 g. of compound No. 1, 4 cc. of pyridine and 2 cc. of acetic anhydride was kept at room temperature overnight, poured into ice water, the formed precipitate was filtered, washed with water and dried. Crystallization from acetone-hexane gave 2-(1'-acetoxy-prop-2'-inyl)-Δ²-androsten-17β-ol acetate (cpd. No. 43).

The compounds Nos. 8, 15, 22, 23 and 24 were treated by the above procedure, to produce respectively:
Cpd. No.
44  2-(1'-oxo-prop-2'-inyl)-Δ²-androsten-17β-ol acetate.
45  2-(1'-oxo-prop-2'-enyl)-Δ²-androsten-17β-ol acetate.
46  2-(prop-3'-inylidene)-androstane-3α,17β-diol diacetate.
47  2-(2'-oxo-propylidene)-Δ³-androsten-17β-ol acetate.
48  2'-methyl-furano-(4',5';2,3)-androstan-17β-ol acetate.

Example VI

The starting compounds of Example V were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

Example VII

To a solution of 5 g. of compound No. 2 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhyride. The benzene layer was separated and washed with 10% sodium carbonate solution and water. Drying, evaporation and crystallization of the residue from ether-hexane produced 2-(1'-caproxy-prop-2'-inyl)-17α-methyl - Δ²-androsten 17β-ol caproate (cpd. No. 49).

The compounds Nos. 3, 4, 6, 7, 9, 10, 11, 13, 14, 16, 17, 18, 20, 21 and 25 to 33 inclusive were treated by the above procedure thus giving respectively:
Cpd. No.
50  2-(1'-caproxy-prop-2'-inyl)-17α-vinyl-Δ²-androsten-17β-ol caproate.
51  2-(1'-caproxy-prop-2'-inyl)-17α-ethinyl-Δ²-androsten-17β-ol caproate.
52  2-(1'-caproxy-prop-2'-inyl)-17α-methyl-19-nor-Δ²-androsten-17β-ol caproate.
53  2-(1'-caproxy-prop-2'-inyl)-17α-ethinyl-19-nor-Δ²-androsten-17β-ol caproate.
54  2-(1'-oxo-prop-2'-inyl)-17α-methyl-Δ²-androsten-17β-ol caproate.
55  2-(1'-oxo-prop-2'-inyl)-17α-vinyl-Δ²-androsten-17β-ol caproate.
56  2-(1'-oxo-prop-2'-inyl)-17α-ethinyl-Δ²-androsten-17β-ol caproate.
57  2-(1'-oxo-prop-2'-inyl)-17α-methyl-19-nor-Δ²-androsten-17β-ol caproate.
58  2-(1'-oxo-prop-2'-inyl) 17α-ethinyl-19-nor-Δ²-androsten-17β-ol caproate.
59  2-(1'-oxo-prop-2'-enyl)-17α-methyl-Δ²- androsten-17β-ol caproate.
60  2-(1'-oxo-prop-2'-enyl)-17α-vinyl-Δ²-androsten-17β-ol caproate.
61  2-(1'-oxo-prop-2'-enyl)-17α-ethinyl-Δ²-androsten-17β-ol caproate.
62  2-(1'-oxo-prop-2'-enyl)-17α-methyl-Δ²-on-drosten-17β-ol caproate.
63  2-(1'-oxo-prop-2'-enyl)-17α-ethinyl-Δ²-androsten-17β-ol caproate.
64  2-(prop-3'-inylidene)-17α-methyl-androstane-3α,17β-diol dicaproate.
65  2-(2'-oxo-propylidene)-17α-methyl-Δ³-androsten-17β-ol caproate.
66  2'-methyl-furano-(4',5';2,3)-17α-methyl-androstan-17β-ol caproate.
67  2-(prop-3'-inylidene)-17α-vinyl-androstane-3α,17β-diol dicaproate.
68  2-(2'-oxo-propylidene)-17α-vinyl-Δ²-androsten-17β-ol caproate.
69  2'-methyl-furano-(4',5';2,3)-17α-vinyl-androstan-17β-ol caproate.

70  2-(prop-3'-inylidene)-17α-ethinyl-androstane-3α,17β-diol dicaproate.
71  2-(2'-oxo-propylidene)-17α-ethinyl-Δ³-androsten-17β-ol caproate.
72  2'-methyl-furano-(4',5';2,3)-17α-ethinyl-androstan-17β-ol caproate.

*Example VIII*

The starting compounds of Example VII were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

I claim:
1. A compound of the following formula:

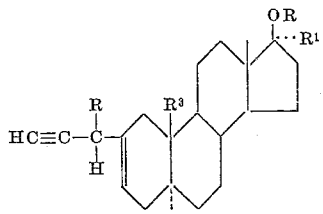

wherein R is selected from the group consisting of hydrogen and a hydrocarbon carboxylic acyl group of less than 12 carbon atoms; $R^1$ is selected from the group consisting of hydrogen, lower alkyl, lower alkenyl and lower alkinyl; and $R^3$ is selected from the group consisting of hydrogen and methyl.

2. A compound of the following formula:

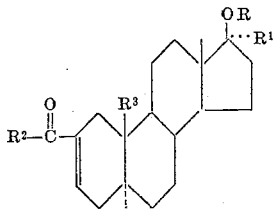

wherein R is selected from the group consisting of hydrogen and a hydrocarbon carboxylic acyl group of less than 12 carbon atoms; $R^1$ is selected from the group consisting of hydrogen, lower alkyl, lower alkenyl and lower alkinyl; $R^2$ is selected from the group consisting of vinyl and ethinyl; and $R^3$ is selected from the group consisting of hydrogen and methyl.

3. A compound of the following formula:

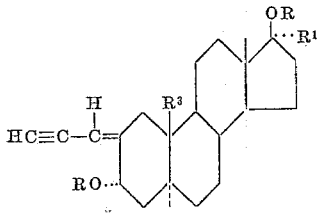

wherein R is selected from the group consisting of hydrogen and a hydrocarbon carboxylic acyl group of less than 12 carbon atoms; $R^1$ is selected from the group consisting of hydrogen, lower alkyl, lower alkenyl and lower alkinyl; and $R^3$ is selected from the group consisting of hydrogen and methyl.

4. A compound of the following formula:

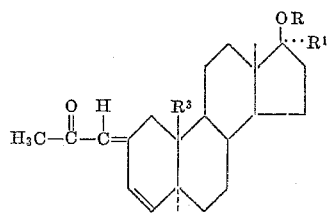

wherein R is selected from the group consisting of hydrogen and a hydrocarbon carboxylic acyl group of less than 12 carbon atoms; $R^1$ is selected from the group consisting of hydrogen, lower alkyl, lower alkenyl and lower alkinyl; and $R^3$ is selected from the group consisting of hydrogen and methyl.

5. A compound of the following formula:

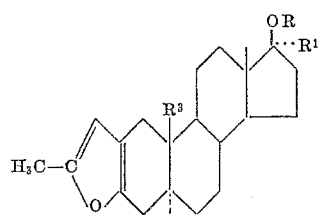

wherein R is selected from the group consisting of hydrogen and a hydrocarbon carboxylic acyl group of less than 12 carbon atoms; $R^1$ is selected from the group consisting of hydrogen, lower alkyl, lower alkenyl and lower alkinyl; and $R^3$ is selected from the group consisting of hydrogen and methyl.

6. 2-(1'-hydroxy-prop-2'-inyl)-Δ²-androsten-17β-ol.
7. 2-(1'-hydroxy-prop-2'-inyl)-17α-methyl - Δ² - androsten-17β-ol.
8. 2-(1'-hydroxy-prop-2'-inyl)-17α - vinyl - Δ² - androsten-17β-ol.
9. 2-(1'-hydroxy-prop-2'-inyl)-17α-ethinyl - Δ² - androsten-17β-ol.
10. 2 - (1' - hydroxy - prop - 2' - inyl) - 19 - nor - Δ²-androsten-17β-ol.
11. 2 - (1' - hydroxy - prop - 2' - inyl) - 17α - methyl-19-nor-Δ²-androsten-17β-ol.
12. 2 - (1' - hydroxy - prop - 2' - inyl) - 17α-ethinyl-19-nor-Δ²-androsten-17β-ol.
13. 2-(1'-oxo-prop-2'-inyl)-Δ²-androsten-17β-ol.
14. 2 - (1' - oxo - prop - 2' - inyl) - 17α - methyl-Δ²-androsten-17β-ol.
15. 2 - (1' - oxo - prop - 2' - inyl) - 17α - vinyl - Δ²-androsten-17β-ol.
16. 2 - (1' - oxo - prop - 2' - inyl) - 17α - ethinyl - Δ²-androsten-17β-ol.
17. 2 - (1' - oxo - prop - 2' - inyl) - 19 - nor - Δ² - androsten-17β-ol.
18. 2 - (1' - oxo - prop - 2' - inyl) - 17α - methyl - 19-nor-Δ²-androsten-17β-ol.
19. 2 - (1' - oxo - prop - 2' - inyl) - 17α - ethinyl - 19-nor-Δ²-androsten-17β-ol.

References Cited in the file of this patent

UNITED STATES PATENTS 3,055,920   Bowers et al. _____ Sept. 25, 1962
3,077,484   Bowers et al. _____ Feb. 12, 1963